United States Patent
Chang et al.

(10) Patent No.: US 11,206,368 B2
(45) Date of Patent: Dec. 21, 2021

(54) DATA READOUT POWER SAVING TECHNIQUES FOR SHIFT REGISTER STRUCTURE

(71) Applicant: OMNIVISION TECHNOLOGIES, INC., Santa Clara, CA (US)

(72) Inventors: Chun-Hsiang Chang, San Jose, CA (US); Zejian Wang, San Jose, CA (US); Chao-Fang Tsai, San Jose, CA (US); Jingwei Lai, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 29 days.

(21) Appl. No.: 16/882,254

(22) Filed: May 22, 2020

(65) Prior Publication Data

US 2021/0368116 A1 Nov. 25, 2021

(51) Int. Cl.
*H04N 5/369* (2011.01)
*H04N 5/372* (2011.01)
*H04N 5/376* (2011.01)
*H04N 5/378* (2011.01)
*H04N 5/374* (2011.01)

(52) U.S. Cl.
CPC .......... *H04N 5/3698* (2013.01); *H04N 5/378* (2013.01); *H04N 5/3742* (2013.01); *H04N 5/3765* (2013.01); *H04N 5/37206* (2013.01)

(58) Field of Classification Search
CPC ............... H04N 5/3698; H04N 5/3765; H04N 5/37206; H04N 5/378; H04N 5/3742
See application file for complete search history.

(56) References Cited

U.S. PATENT DOCUMENTS

| | | | | |
|---|---|---|---|---|
| 9,294,703 B2* | 3/2016 | Choo | ................... | H04N 5/3742 |
| 10,110,837 B2* | 10/2018 | Lin | ...................... | H04N 5/3742 |
| 2006/0220939 A1* | 10/2006 | Kirsch | .................. | H04N 5/378 341/155 |
| 2008/0137461 A1* | 6/2008 | Pyeon | .................. | G11C 7/1075 365/219 |
| 2010/0312999 A1* | 12/2010 | Walker | .................. | G11C 19/00 712/221 |
| 2012/0320245 A1* | 12/2012 | Hasegawa | ............ | H04N 5/3742 348/300 |
| 2015/0144771 A1* | 5/2015 | Hagihara | ............. | H04N 5/3765 250/208.1 |
| 2015/0304583 A1* | 10/2015 | Lee | ...................... | H04N 5/3742 348/300 |
| 2018/0255255 A1* | 9/2018 | Lin | ...................... | H04N 5/3742 |
| 2019/0363118 A1* | 11/2019 | Berkovich | ........... | H04N 5/3745 |

* cited by examiner

*Primary Examiner* — Nhan T Tran
(74) *Attorney, Agent, or Firm* — Christensen O'Connor Johnson Kindness PLLC

(57) ABSTRACT

A data transmission circuit of an image sensor. In one embodiment, the data transmission circuit includes a plurality of banks coupled in a series. A peripheral bank of the plurality of transmission banks is coupled to a function logic. Each bank includes a plurality of local buffers coupled to a local buffer control and a plurality of global buffers coupled to a global buffer control. The local buffers are settable to their enabled or disabled state by a bank enable command at the local buffer control. The enabled local buffers are configured to transfer local data to shift registers of their respective bank. The disabled local buffers are configured not to transfer the local data to the shift register of their respective bank.

20 Claims, 11 Drawing Sheets

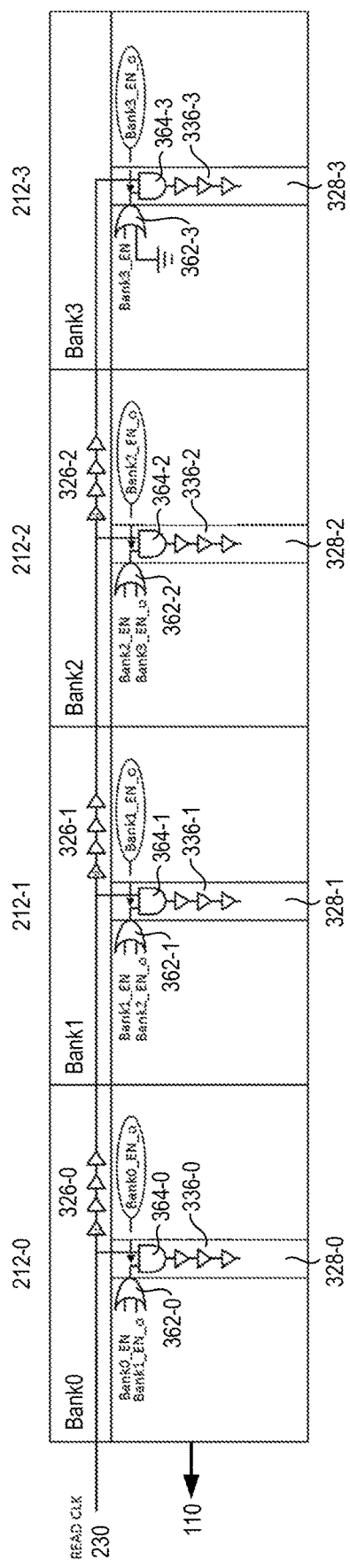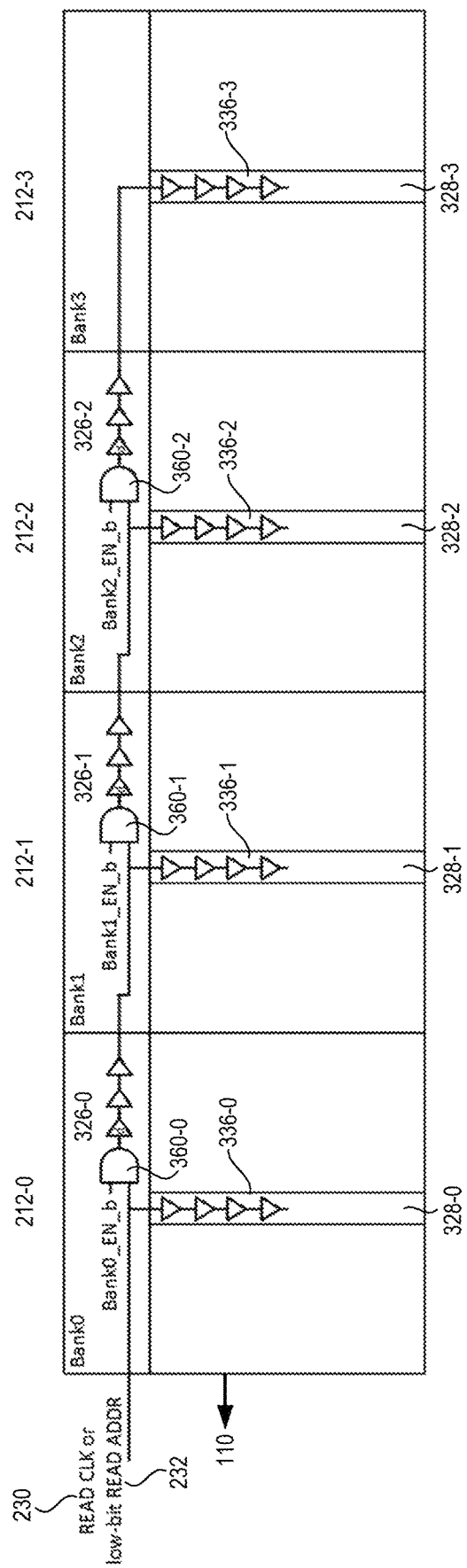
FIG. 7
FIG. 8

Non-mirror readout without power saving

| Bank Main Blocks | Bank Enable Sequence | Bank0 | Bank1 | Bank2 | Bank3 |
|---|---|---|---|---|---|
| Bank0 | READ ADDR Decoder | ON | OFF | OFF | OFF |
| Bank0 | Sense Amplifers | ON | OFF | OFF | OFF |
| Bank0 | Shift Registers | ON | ON | ON | ON |
| Bank0 | Global Buffers | ON | ON | ON | ON |
| Bank1 | READ ADDR Decoder | OFF | ON | OFF | OFF |
| Bank1 | Sense Amplifers | OFF | ON | OFF | OFF |
| Bank1 | Shift Registers | ON | ON | ON | ON |
| Bank1 | Global Buffers | ON | ON | ON | ON |
| Bank2 | READ ADDR Decoder | OFF | OFF | ON | OFF |
| Bank2 | Sense Amplifers | OFF | OFF | ON | OFF |
| Bank2 | Shift Registers | ON | ON | ON | ON |
| Bank2 | Global Buffers | ON | ON | ON | ON |
| Bank3 | READ ADDR Decoder | OFF | OFF | OFF | ON |
| Bank3 | Sense Amplifers | OFF | OFF | OFF | ON |
| Bank3 | Shift Registers | ON | ON | ON | ON |
| Bank3 | Global Buffers | NA | NA | NA | NA |
| # of working decoder | | 1 | 1 | 1 | 1 |
| # of working sense amps | | 1 | 1 | 1 | 1 |
| # of working shift registers | | 4 | 4 | 4 | 4 |
| # of working global buffers | | 3 | 3 | 3 | 3 |
| # of total working blocks | | 9 | 9 | 9 | 9 |

FIG. 10A

Non-mirror readout with local power saving

| Bank Main Blocks | Bank Enable Sequence | Bank0 | Bank1 | Bank2 | Bank3 |
|---|---|---|---|---|---|
| Bank0 | READ ADDR Decoder | ON | OFF | OFF | OFF |
| | Sense Amplifers | ON | OFF | OFF | OFF |
| | Shift Registers | ON | ON | ON | ON |
| | Global Buffers | ON | ON | ON | ON |
| Bank1 | READ ADDR Decoder | OFF | ON | OFF | OFF |
| | Sense Amplifers | OFF | ON | OFF | OFF |
| | Shift Registers | OFF | ON | ON | ON |
| | Global Buffers | ON | ON | ON | ON |
| Bank2 | READ ADDR Decoder | OFF | OFF | ON | OFF |
| | Sense Amplifers | OFF | OFF | ON | OFF |
| | Shift Registers | OFF | OFF | ON | ON |
| | Global Buffers | ON | ON | ON | ON |
| Bank3 | READ ADDR Decoder | OFF | OFF | OFF | ON |
| | Sense Amplifers | OFF | OFF | OFF | ON |
| | Shift Registers | OFF | OFF | OFF | ON |
| | Global Buffers | NA | NA | NA | NA |
| # of working decoder | | 1 | 1 | 1 | 1 |
| # of working sense amps | | 1 | 1 | 1 | 1 |
| # of working shift registers | | 1 | 2 | 3 | 4 |
| # of working global buffers | | 3 | 3 | 3 | 3 |
| # of total working blocks | | 6 | 7 | 8 | 9 |

FIG. 10B

Non-mirror readout with global and local power saving

| Bank Main Blocks | Bank Enable Sequence | Bank0 | Bank1 | Bank2 | Bank3 |
|---|---|---|---|---|---|
| Bank0 | READ ADDR Decoder | ON | OFF | OFF | OFF |
| | Sense Amplifers | ON | OFF | OFF | OFF |
| | Shift Registers | ON | ON | ON | ON |
| | Global Buffers* | OFF | ON | ON | ON |
| Bank1 | READ ADDR Decoder | OFF | ON | OFF | OFF |
| | Sense Amplifers | OFF | ON | OFF | OFF |
| | Shift Registers | OFF | ON | ON | ON |
| | Global Buffers* | OFF | OFF | ON | ON |
| Bank2 | READ ADDR Decoder | OFF | OFF | ON | OFF |
| | Sense Amplifers | OFF | OFF | ON | OFF |
| | Shift Registers | OFF | OFF | ON | ON |
| | Global Buffers* | OFF | OFF | OFF | ON |
| Bank3 | READ ADDR Decoder | OFF | OFF | OFF | ON |
| | Sense Amplifers | OFF | OFF | OFF | ON |
| | Shift Registers | OFF | OFF | OFF | ON |
| | Global Buffers* | NA | NA | NA | NA |
| # of working decoder | | 1 | 1 | 1 | 1 |
| # of working sense amps | | 1 | 1 | 1 | 1 |
| # of working shift registers | | 1 | 2 | 3 | 4 |
| # of working global buffers | | 0 | 1 | 2 | 3 |
| # of total working blocks | | 3 | 5 | 7 | 9 |

* Global buffers include READ CLK and low-bit READ ADDR

FIG. 10C

DATA READOUT POWER SAVING TECHNIQUES FOR SHIFT REGISTER STRUCTURE

BACKGROUND INFORMATION

Field of Disclosure

This disclosure relates generally to image sensors, and in particular to power saving during data transmission in an image sensor.

Background

Image sensors have become ubiquitous. They are widely used in digital still cameras, cellular phones, and security cameras, as well as medical, automotive, and other applications. The technology for manufacturing image sensors continues to advance at a great pace. For example, the demands for higher image sensor resolution and lower power consumption motivate further miniaturization and integration of image sensors into digital devices.

In data transmitters with shift register structures, conservation of power is desired. However, increased frequency of the read clock and address clocks lead to increased power consumption and to increased signal noise if the timing of a counter (such as a counting clock) overlaps with the timing of data transmission (such as a read clock and address clock). As the resolution of the image sensor increases, power consumption and signal noise also tend to increase. Therefore, systems and methods are needed for reduced power consumption and signal noise.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 is a block diagram of a local buffer control for a plurality of banks in accordance with an embodiment of the present technology.

FIG. 8 is a block diagram of a global buffer control for a plurality of banks in accordance with an embodiment of the present technology.

FIG. 10A is a chart showing the enabled components of an image sensor with a non-mirror readout not using power saving techniques in accordance with the present technology.

FIG. 10B is a chart showing the enabled components of an image sensor with a non-mirror readout using local power saving techniques in accordance with the present technology.

FIG. 10C is a chart showing the enabled components of an image sensor with a non-mirror readout using local and global power saving techniques in accordance with the present technology.

Figure 1:
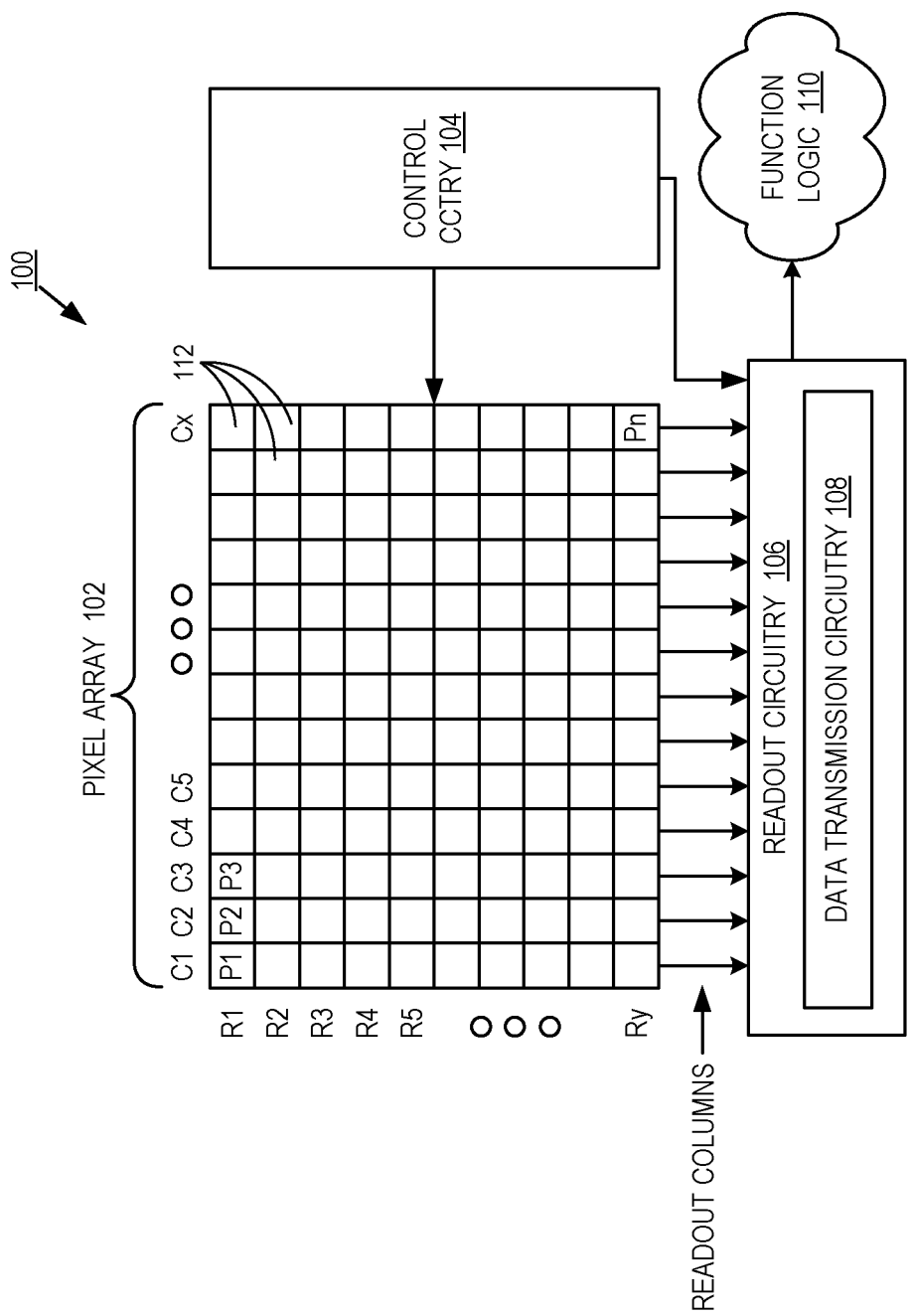
FIG. 1 is an example image sensor in accordance with an embodiment of the present technology.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Image sensors that save power during data transmission are disclosed. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, examples in accordance with the teachings of the present technology are directed to conserving power in image sensors that transmit image data through shift register structures. In different embodiments, these power savings apply to both local data transfer (within a bank) and global data transfer (among the banks). For the local data transfer, a logic combination of AND gates and OR gates at the input of the local buffers (also referred to as a local buffer control) may control data transmission of each transmission bank. To save power, the shift register of a bank may be disabled after image data is transmitted to an adjacent, downstream bank.

During the global data transfer, global data is transferred from inner transmission banks toward peripheral banks. For example, an AND gate at the input of global buffers (also referred to as a global buffer control) may control data transmission between the banks. Additionally, by disabling the local buffers and/or global buffers, noise in the image sensor may be reduced by decreasing the probability of an overlap between the timing of a counter and data transmission (such as a read clock signal or a low bit read address signal).

FIG. 1 illustrates an example imaging system 100 in accordance with an embodiment of the present disclosure. The imaging system 100 includes pixel array 102, control circuitry 104, readout circuitry 106, and function logic 110. In one example, the pixel array 102 is a two-dimensional (2D) array of photodiodes, or image sensor pixels 112 (e.g., pixels P1, P2 Pn). As illustrated, the photodiodes are arranged into rows (e.g., rows R1 to Ry) and columns (e.g., column C1 to Cx). In operation, the photodiodes acquire image data of a person, place, object, etc., which can then be used to render a 2D image of the person, place, object, etc. However, the photodiodes do not have to be arranged into rows and columns and may take other configurations.

In an embodiment, after each pixel 112 in pixel array 102 has acquired its image data or image charge, the image data is read out by a readout circuitry 106 and then transferred to a function logic 110. In various embodiments, the readout circuitry 106 may include signal amplifiers, analog-to-digital (ADC) conversion circuitry, and data transmission circuitry 108. The function logic 110 may store the image data or even manipulate the image data by applying post image effects (e.g., crop, rotate, remove red eye, adjust brightness, adjust contrast, or otherwise). In some embodiments, the control circuitry 104 and function logic 110 may be combined into a single functional block to control the capture of images by the pixels 112 and the readout of image data from the readout circuitry 106. The function logic 110 may be a digital processor, for example. In one embodiment, the readout circuitry 106 may readout a row of image data at a time along readout column lines (as illustrated) or may readout the image data using a variety of other techniques (not illustrated), such as a serial readout or a full parallel readout of all pixels simultaneously.

In one embodiment, the control circuitry 104 is coupled to the pixel array 102 to control operation of the plurality of photodiodes in the pixel array 102. For example, the control circuitry 104 may generate a shutter signal for controlling image acquisition. In one embodiment, the shutter signal is a global shutter signal for simultaneously enabling all pixels within pixel array 102 to simultaneously capture their respective image data during a single acquisition window. In another embodiment, the shutter signal is a rolling shutter signal such that each row, column, or group of pixels is sequentially enabled during consecutive acquisition windows. In another embodiment, image acquisition is synchronized with lighting effects such as a flash.

In one embodiment, data transmission circuitry 108 may receive image data from ADCs, thus converting analog image data into digital representations of the same. The digital representation of the image data is provided to the function logic 110. In some embodiments, the data transmission circuitry 108 may receive the digital representations of the image data from the ADCs in parallel and provide the same to the function logic 110 in series. In different embodiments, the digital representations of the image data may be data words ranging from 11 to 13 bits, with 8 to 10 bits being associated with the image data and the remaining bits (two to three bits) being reserved for error correction. The error correction may be generated using any known error correction code (ECC), such as Hamming code, Reed-Solomon code, etc.

The image data received by the data transmission circuit 108 may comprise a row of data, less than a row of data, or more than a row of data, which may then be provided to the function logic 110 in series, as noted. However, instead of conventional data transmission techniques that provide the data over one or more conductors that have been pre-charged to a high logic level, for example, the data transmission circuitry 108 may comprise a plurality of banks configured to receive the image data in parallel, followed by providing bank data sequentially to adjacent banks in a direction toward the function logic 110. The data may propagate through a series of latches that couple adjacent banks, and which are controlled by a common clock signal. The common clock signal 230 may be delayed by an amount of time (e.g., number of clock cycles) into the bank in relation to the function logic 110.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
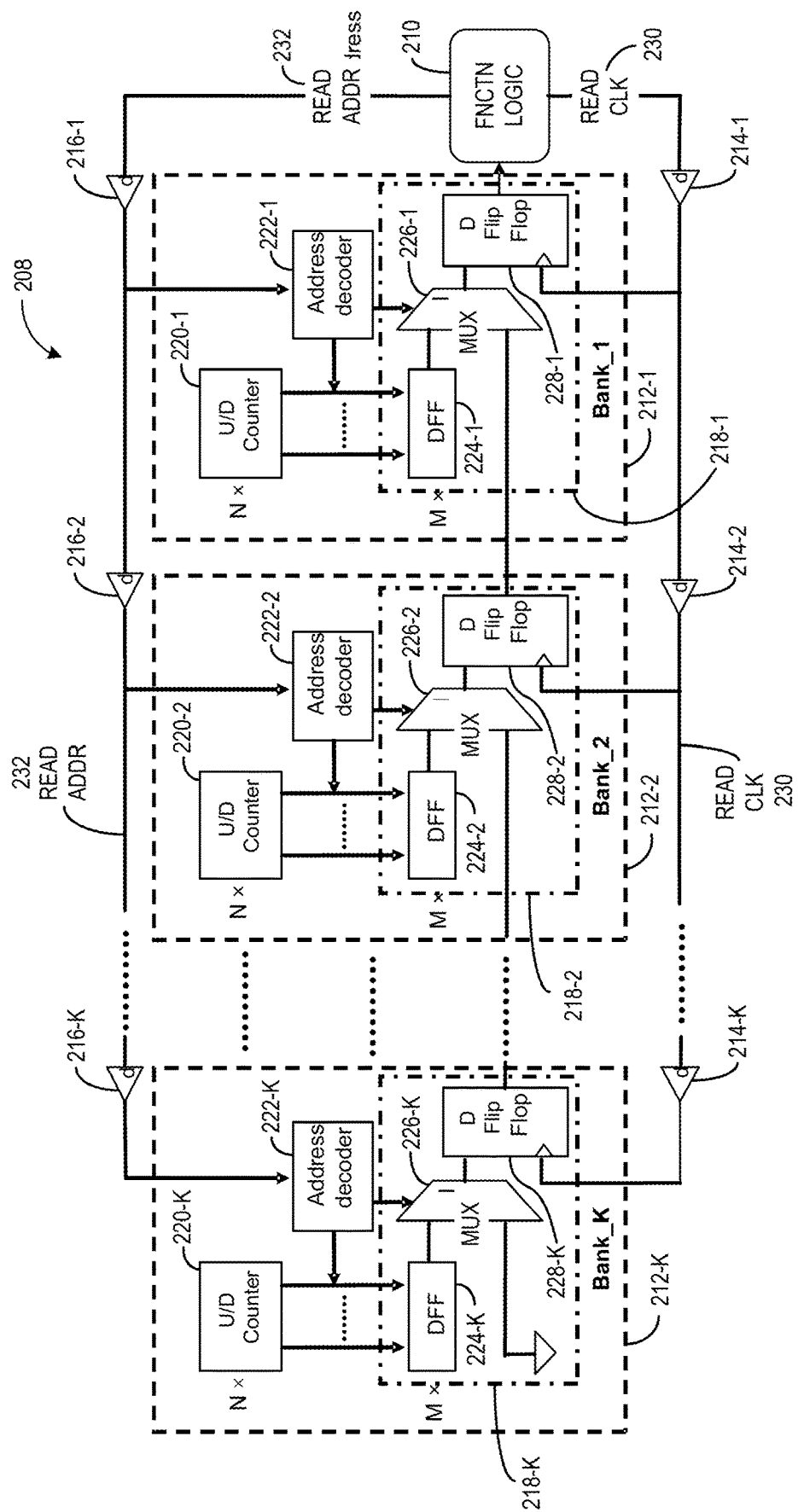
FIG. 2 is an example data transmission circuit in accordance with an embodiment of the present technology.

FIG. 2 is a data transmission circuit 208 in accordance with an embodiment of the present disclosure. The data transmission circuit 208 may be an example of the data transmission circuitry 108. In operation, the data transmission circuit 208 may receive image data from a pixel array, such as the pixel array 102, and serially provide the image data to function logic 210. In different embodiments, the image data (data words) received by the data transmission circuit 208 may be in analog or digital form. In some embodiments, the image data, e.g., digital image data, may be provided to function logic 210 corresponding to the function logic 110 or a combination of the control circuitry 104 and the function logic 110 shown in FIG. 1.

In operation, the individual banks 212 receive a read address (READ ADDR) 232 and a read clock signal (READ CLK) 230 through a plurality of delays (also referred to as buffers) 216 and 214, respectively. The data transmission circuit 208 may include K banks, such as banks 212-1 through 212-K. In different embodiments, K may be 8 or 16, but other numbers of banks are also contemplated. The banks 212-2 to 212-K may be coupled in series where a peripheral bank (e.g., bank 212-1 in FIG. 2) is coupled to the function logic 210. In general, image data propagates through a plurality of banks toward the function logic 210. In some embodiments, image data from bank 212-1 is provided to the function logic 210 first, sequentially followed by data from banks 212-2 through 212-K (also designated as Bank_2 through Bank_K in FIG. 2). Other than the bank 212-1 that is directly connected to the function logic 210, data from other banks 212 propagate through all other interstitial banks 212 in the data path toward the function logic 210. For example, image data from bank 212-K propagate through banks 212-(K-1) through 212-1 before reaching the function logic 210.

In the illustrated embodiment, each bank 212 includes a plurality of channels 218, an address decoder 222, and a plurality of up/down counters (U/D Counter) 220. In other embodiments, different types of counters may be used, for example, ripple counters, Gray-code counters, and so on. In some embodiments, a bank 212 may include N up/down counters 220 and M channels 218, where N represents the number of pixels 112 the bank may receive image data from, and M represents the number of channels 218. For each bank 212 there may be 8 or 16 channels 218, but other numbers of channels are contemplated herein. Image data of each bank 212 may be provided to a subsequent downstream bank 212 in response to the read clock signal 230. As used herein, downstream refers to movement of data toward the function logic 210. Because the banks 212 are coupled in series, image data propagates from an initial bank 212 through each interstitial bank 212 between the initial bank and the function logic 210. The image data may move in a series of hops from one interface D flip flop 228 to the next interface D flip flop 228 in response to a series of read clock signals 230.

The plurality of up/down counters 220 for each bank 212 may be included in ADC converters of associated readout circuitry, such as readout circuitry 106. While the up/down counters 220 are shown as part of the plurality of banks 212, the depiction is for ease of discussion and different implementations may be possible. Each bank 212 may include N up/down counters 220, where each bank 212 receives image data from N pixels 112. In some embodiments, the N up/down counters 220 for each bank 212 may correspond to number of pixels 112 in a row of pixels 112 of a pixel array, such as the pixel array 102. Each up/down counter 220 can convert image data received from a pixel 112 into a digital representation of the same. For example, each up/down counter 220 may convert an analog voltage into a digital data word. The data word may be 8 or 9 bits long to represent the image data, while 2 to 3 error correction code (ECC) bits may be appended to the word. As used herein, image data refer both to the analog and digital signal, for sake of brevity.

The address decoder 222 may receive a delayed read address 232 (e.g., delayed through delay buffers or delay banks 216) and provide control signals in response. In some embodiments, the control signals determine what image data to provide to one or more of the plurality of channels 218. In some embodiments, the read address data 232 define a sequence of providing the N image data to the function logic 210. Additionally, the control signals control a multiplexer (MUX) 226 that sequentially provides the image data to a corresponding D flip flop 228. In some embodiments, the read address 232 may include up to eight bits, with a portion of the bits determining which image data to provide to which of the plurality of channels 218, and the remaining bits controlling the MUX 226. As will be discussed below, the MUX 226 selects between image data of the present bank 212 and image data from the upstream adjacent bank 212. As used herein, upstream refers to directions away from the function logic 210.

In some embodiments, an individual channel 218 includes an internal D flip flop (DFF) 224, a MUX 226, and an interface D flip flop 228. Image data from one or more up/down counters 220 of a bank 212 may be provided to one or more channels 218 during a data transmission operation. In some embodiments, each channel 218 of the plurality of channels 218 is provisioned with a plurality of data words in response to a read address that is decoded by the address decoder 222. In other embodiments, only a single channel 218 is used during a data transmission operation. In different embodiments, channels 218 may be used in parallel or series.

The internal DFF 224 of each channel 218 may receive image data from one or more of the plurality of up/down counters 220 in response to a control signal from the address counter 220. The image data may be latched by the internal DFF 224 and coupled to the MUX 226, to be forwarded to the interface D flip flop 228 in response to the MUX control signal from the address decoder 222. In some embodiments, the internal DFF 224 may be coupled to the plurality of up/down counters 220 via a multiplexer (not shown in FIG. 2). In such embodiments, the control signal provided by the address decoder 222 may determine which up/down counter 220 to couple to which channel 218.

The MUX 226 may be coupled to an output of the internal DFF 224 and an output of an upstream interface D flip flop 228. In response to a multiplexer control signal from the address decoder 222, the MUX 226 may couple either the output of the internal DFF 224 or the output of the upstream interface D flip flop 228 to an input of the associated internal D flip flop 228. In response to a read clock signal, the internal D flip flop 228 latches image data either from the associated channel 218 or from an upstream bank 212. After latching the image data, the image data is provided to a downstream MUX 226.

Each bank 212 receives the read address (READ ADDR) 232 and the read clock (READ CLK) 230 signals via a plurality of delays 216 and 214, respectively. For example, bank 212-1 receives the read address 232 after being delayed by a single time delay 216-1, whereas bank 212_K receives the read address after being delayed K times due to delays 212-1 through 212-K. The same is true for the read clock signal 230. In general, the delay of each delay 214 and 216 may be very small, at least compared to a clock period. In some embodiments, the delay of each delay 214 and 216 may be a period of a system clock (not shown in FIG. 2) divided by the number of banks 212 (e.g., K). Delaying at least the read clock signal 230 allows each interface D flip flop 228-1 through 228-K to latch data sequentially instead of simultaneously. By sequentially triggering each interface D flip flop 228, the peak electrical current is reduced, thus reducing peak power consumption. Additionally, by triggering the interface D flip flops 228 sequentially, electromagnetic interference is also reduced.

In operation, the function logic 210 or the control circuitry 104 provides a read address signal 232 and a read clock signal 230 to the data transmission circuitry 208. In some embodiments, the two signals 232/230 are provided concurrently. In other embodiments, the read address signal 232 may be provided prior to the read clock signal 230 so that the image data associated with the read address is ready before the read clock signal arrives. In response to the read address signal 232 and read clock signal 230, one or more banks 212 provide image data to the function logic 210 via intervening banks 212. For example, if a channel 218 of bank 212-4 is targeted by the read address 232, then the image data may propagate to the function logic 210 via banks 212-3, 212-2, and 212-1 before arriving to the function logic 210. To move the data between banks, subsequent pulses of the read clock signal 230 will trigger the movement of the image data from bank 212 to bank 212. Additionally, the read address signal 232 received by the banks 212 may cause the banks 212 that are not providing data to control the MUX 226 as to provide data from an upstream bank 212 to the associated interface D flip flop 228.

In some examples, each bank 212, e.g., 212-1 through 212-K, may direct image data to a respective interface D flip flop 228 of one or more channels 218. Once the local data (not illustrated in FIG. 2) is latched by the respective interface D flip flop 228, the local data may propagate to a subsequent downstream interface D flip flop 228 via a subsequent pulse of the read clock signal 230. To move all K banks of image data into the function logic 210, K clock signals may be required.

Figure 3:
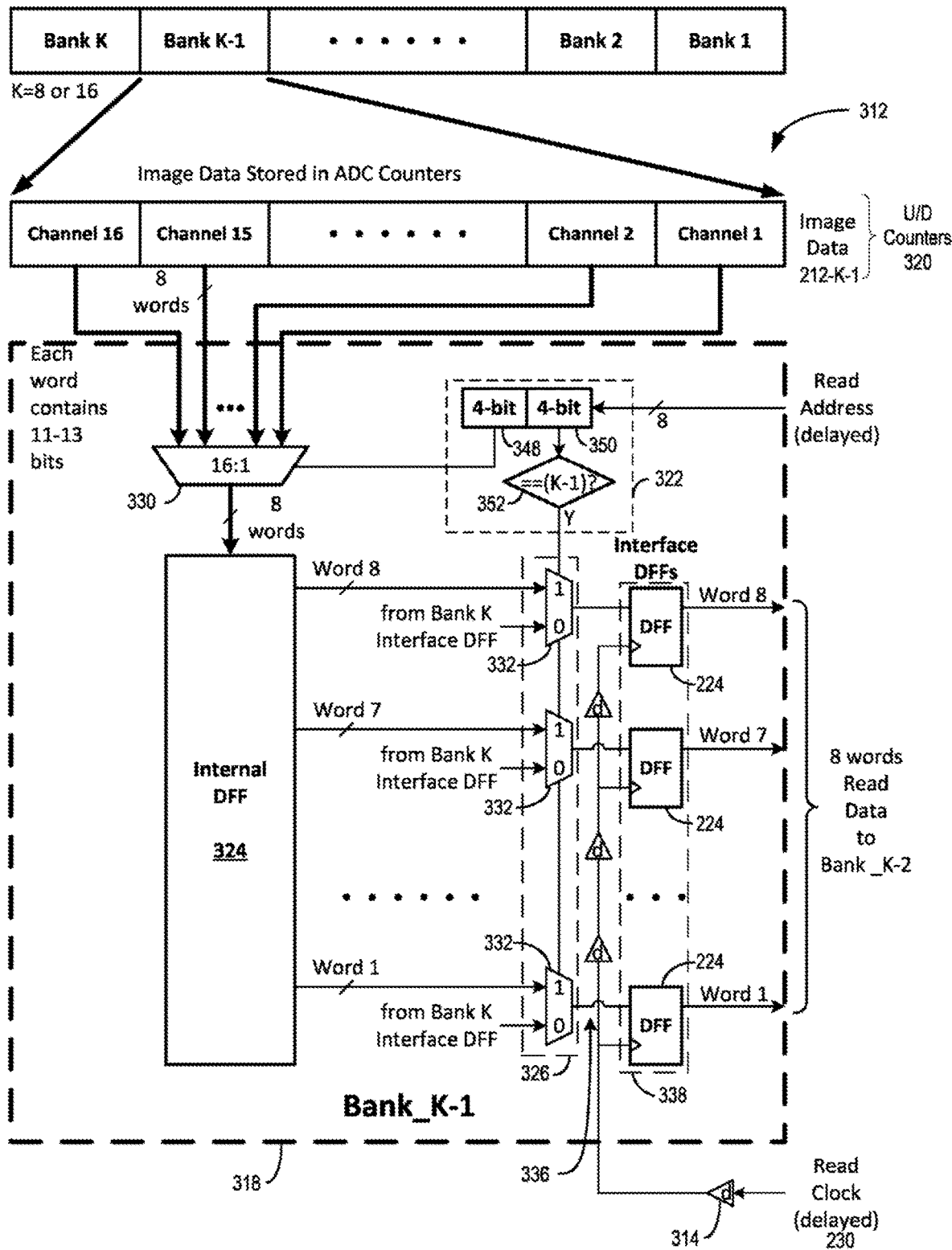
FIG. 3 is a block diagram of a bank in accordance with an embodiment of the present technology.

FIG. 3 is a block diagram of a bank 312 in accordance with an embodiment of the present disclosure. Illustrated bank 212-K-1 may be but one example of a bank 212 of the data transmission circuit 208. The illustrated embodiment of the bank 312 includes an up/down counter 320 and a channel 318, where the bank 312 is bank_K-1 of K banks, as shown at the top of FIG. 3. While only a single channel 318 is shown, the bank 312 may have a plurality of channels 318, such as 8 or 16. The illustrated embodiment of the channel 318 includes a first MUX 330, an internal DFF 324, an address decoder 322, a second MUX 326, a plurality of delays 336, and an interface DFF 338. The illustrated embodiment of the second MUX 326 includes a plurality of 2:1 multiplexers 332, and the illustrated embodiment of the interface DFF 338 includes a plurality of DFFs 224.

The illustrated embodiment of the up/down counter 320 is shown as a block that includes 16 channels, with each channel including eight data words. Of course, the numbers of channels and data words are for example purposes only, and should not be considered limiting to the present disclosure. The up/down 320 may be an example of the up/down counter 220, and may receive analog image data from a pixel, or a plurality of pixel and provide digital image data in response. In the embodiment of FIG. 3, the up/down counter 320 may be coupled to receive image data from 16 pixels, hence the 16 channels. The data words may be 11- to 13-bit data words, with 8 to 10 bits used for image data, and the remaining bits used for error correction. The eight data words outputs of the 16 channels of the up/down counter 320 may be coupled to a respective input of the first MUX 330.

The MUX 330 may be a 16:1 multiplexer coupled to provide data words from one of the 16 channels of the up/down counter 320 to the internal DFF 324 in response to a control signal. The control signal may be provided by the address decoder 322, for example. The first MUX 330 may asynchronously provide the 8 data words of the selected channel to the internal DFF 324 in response to the control signal.

The address decoder 322 may receive a read address from a control circuit or function logic, and provide the image data associated with the read address in response. The read address may be delayed a respective amount of delay in accordance with a relation of the bank 312 to the function logic, such as function logic 110 and/or 210. For example, bank_K-1 of FIG. 3 will receive the read address after being delayed by K-1 delays. In some embodiments, the read address may be an eight-bit word, with four bits used to determine a target channel of the up/down counter 320, and the other four bits used to control the second MUX 326. The read address may be decoded by the address decoder 322 to determine which channel to couple to the internal DFF 324 via the first MUX 330, and to further determine how to control the second MUX 326.

The address decoder 322 may include two four-bit decoders 348 and 350, and a logic gate 352. The two four-bit decoders 348 and 350 may decode a different part of the read address and provide a respective control signal in response. For example, the four-bit decoder 348 may determine which of the 16 channels to couple to the internal DFF 324, e.g., how to control the first MUX 330, and the four-bit decoder 350 may determine whether the second MUX 326 couples the output of the internal DFF 324 or the output of a subsequent upstream bank to the interface D flip flop 338. While the logic gate 352 is shown as a flow chart-type decision block in FIG. 3, any type of logic gate may be implemented, such as an OR, AND, XOR, XNOR, etc. The logic gate 352 may receive the output of the four-bit decoder 350 and determine whether the output of the internal DFF 324 is to be coupled to the input of the interface D flip flop 338, e.g., if the output equals the address for that bank 312, e.g., bank_K-1.

The internal DFF 324 may be a latch capable of asynchronously latching data words of a channel coupled through the first MUX 330. In some embodiments, the internal DFF 324 may be formed from a plurality of D flip flops, but other types of latches may also be implemented. In some embodiments, there may be eight data words, but the number of words should not be considered limiting. Outputs of the internal DFF 324 may be provided to inputs of the second MUX 326. In some embodiments, each output of the internal DFF 324 may provide a single data word, which may include eight to 13 bits. Additionally, each output of the internal DFF 324 may be provided to an input of a 2:1 multiplexer 332 forming the second MUX 326.

The illustrated embodiment of the second MUX 326 includes a plurality of 2:1 multiplexers 332 coupled to respective outputs of the internal DFF 324, and further coupled to outputs of a subsequent upstream bank. In some embodiments, the number of 2:1 multiplexers 332 may depend on the number of words provided by each channel of the up/down counter 320. For example, there may be eight 2:1 multiplexers 332. Additionally, each of the plurality of multiplexers 332 may be coupled to receive a control signal form the address decoder 322. The control signal may determine if each of the plurality of multiplexers 332 coupled the output of the internal DFF 324 or the subsequent upstream bank to inputs of the interface D flip flop 338. In some embodiments, the default of the plurality of multiplexers may be to couple the upstream bank to the interface D flip flop 338, and only couple the output of the internal DFF 324 in response to a control signal provided by the address decoder 322.

The interface D flip flop 338 (labeled Interface DFF in FIG. 3) may be coupled to receive data words at a plurality of inputs, latch and provide the same in response to the read clock signal. In some embodiments, the interface D flip flop 338 may be formed from a plurality of D flip flops 224. In general, the number of D flip flops may be commensurate with a number of data words received as inputs. For example, to receive eight data words, there may be eight D flip flops 224. Outputs of the interface D flip flop 338 may be coupled to inputs of a second MUX of a subsequent downstream bank, for example. However, the outputs of the interface D flip flop 338 of a bank_1 may be coupled to an input of a logic function, such as logic function 110/210.

The plurality of delay 336 may further delay the read clock signal, and may be coupled to trigger a respective D flip flop 224. For example, seven delays may be implemented with each of the seven delays coupled between instances of D flip flops 224. By further delaying the read clock signal, each data word from a channel is latched in a cascade-like manner so that each of the D flip flops do not trigger simultaneously. In some embodiments, data word 1 may be latched first followed by data word 2, then data word 3, and so on until all eight data words are latched.

Figure 4:
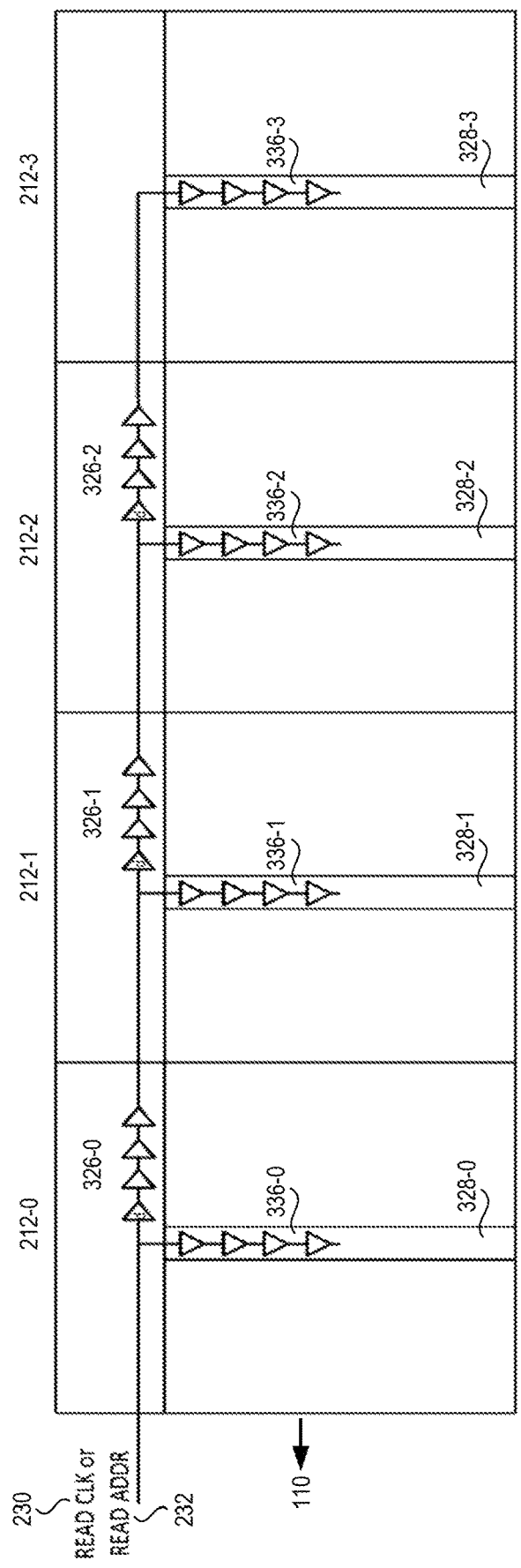
FIG. 4 is a block diagram of a plurality of banks in accordance with an embodiment of the present technology.

FIG. 4 is a block diagram of a plurality of banks 212 in accordance with an embodiment of the present technology. For simplicity, four banks, 212-0, 212-1, 212-2, and 212-3 are illustrated but in other embodiments the data transmitter 108 may include a smaller or larger number of banks 212. A peripheral bank 212-0 is connected to the function logic 110. In other embodiments, the peripheral bank may be 212-3. Data flows from a bank 212 to an interstitial bank downstream, towards the function logic 110. In some embodiments, the read clock signal 230 acts as a control signal to transmit data from one bank (e.g. 212-1) to another (e.g. 212-0) toward the function logic 110. In other embodiments, a read address signal 232 may act as a control signal. The address signal 232 may be a low bit read address signal. Each bank 212 may include a shift register 328 to receive local data 436 (not pictured in FIG. 3) from the bank 212.

Global buffers 326-0, 326-1, and 326-2 enable transmission of image data from one bank, e.g. 212-1, to another, e.g. 212-0 based on the read clock or read address control signal. For simplicity, the global buffers 326 are shown enabling transmission of data from bank 212-3 toward bank 212-0 downstream toward the function logic (also referred to as 'non-mirror' data transfer), but in other embodiments the global buffers 326 may enable transmission of data from bank 212-3' to 212-0' toward the function logic (also referred to as 'mirror' data transfer). Local buffers 336-0, 336-1, 336-2, and 336-3 transfer data from each bank 212, e.g., 212-0, into that bank's shift register 328, e.g., 328-0.

The buffers dissipate power during data transfer. Generally, power dissipation increases with the resolution of the image sensor. Furthermore, additional signal noise may be generated when the timing of the counter, and the data transmission overlap, e.g., the read clock signal 230.

Figure 5:
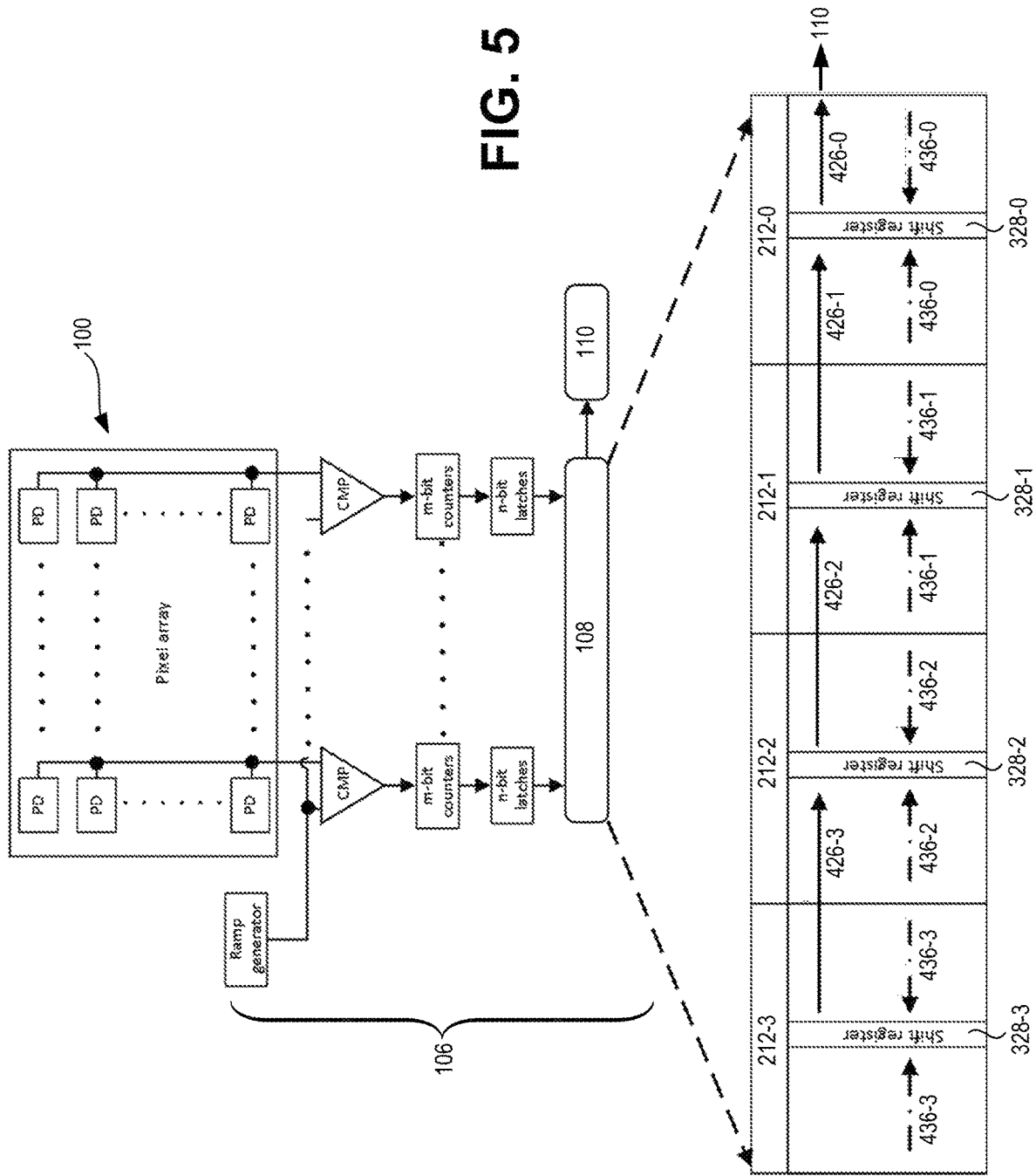
FIG. 5 is an example image sensor in accordance with an embodiment of the present technology.

FIG. 5 is an example image sensor 100 in accordance with an embodiment of the present technology. The pixel array 100 includes a plurality of photodiodes (PD). The analog voltages from the photodiodes are converted to digital image data in the readout circuitry 106. In an example, comparators (CMP) are coupled to receive the analog voltages from the photodiodes, which are compared with a ramp signal from a ramp generator. The outputs of the comparators are coupled to control M-bit counters to generate digital image data values in response to the comparisons of the ramp signal and the analog voltages from the photodiodes. The digital values from the M-bit counters are then latched into the N-bit latches. Any number of bit counters and latches may be used, and the bit number of counters may be different from the bit number of latches.

The digital image data latched in the N-bit latches is next transferred to data transmitter 108. The dashed arrows illustrate a plurality of banks 212 inside the data transmission circuitry (also referred to as data transmitter) 108. For simplicity, four banks 212-0, 212-1, 212-2, and 212-3 are illustrated, but in other embodiments, the system may include more or fewer banks. Local data 436 is transferred within each individual bank 212 toward the bank's shift register 328. Global data 426 is transferred downstream between adjacent banks, i.e., toward the function logic 110. A mirror readout is illustrated where global data 426 is transferred from bank 212-3 to peripheral bank 212-0 towards the function logic 110.

Figure 6:
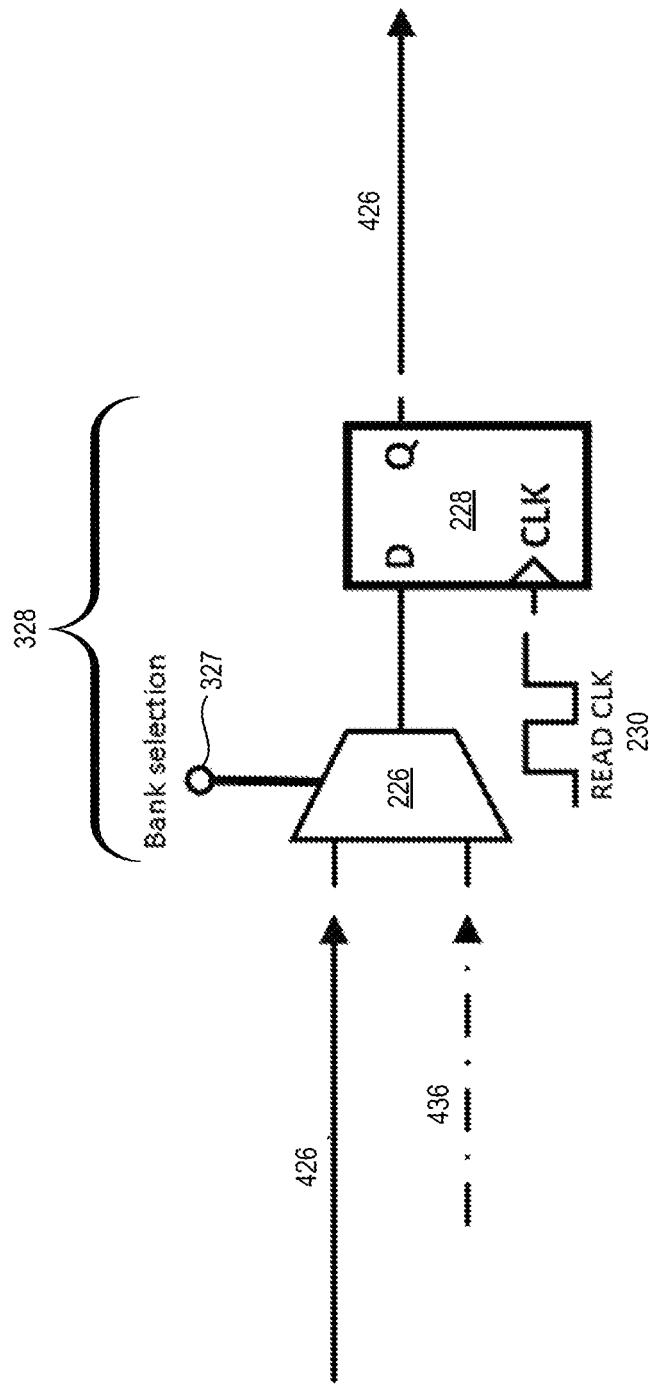
FIG. 6 is an example shift register in accordance with an embodiment of the present technology.

FIG. 6 is an example shift register 328 in accordance with an embodiment of the present technology. MUX 226 receives global data 426 and local data 436. The illustrated shift register includes a MUX 226 with a bank selection input 327 that selects either the global data 426 or the local data 436 as an output of the MUX. The output of the MUX 226 may be provided to the DFF 228. In some embodiments, the read clock signal 230 provides a control signal to the DFF 228. In other embodiments, the control signal may be a read address signal 232 (not shown in FIG. 6). In response to the read clock signal 230, the DFF 228 transfers the global data 426 to the next bank downstream, toward the function logic 110.

FIG. 7 is a block diagram of a local buffer control for a plurality of banks 212 in accordance with an embodiment of the present technology. A read clock signal 230 may control the flow of data. In operation, the global buffers 326 (also referred to as "delays") transfer data from one bank 212 to an adjacent bank 212 toward a function logic 110. Local buffers 336 transfer data to shift registers 328. A series of controls in the form of logic AND gate 364 and logic OR gate 362 may control the input of the local buffers 336 at each respective transmission bank 212.

In operation, the AND logic gate 364 and OR logic gate 362 may activate and deactivate selected banks of the local buffers 336. The AND logic gate 364 and OR logic gate 362 may be collectively referred to as a "local buffer control." In the illustrated embodiment, the local buffer control includes one AND gate and one OR gate. However, in different embodiments, different combinations of logic elements (e.g., AND, OR, NOR, etc. gates) may be used for the local buffer control.

In operation, the local buffers 336-0 of the leftmost bank 212-0 may be selected by setting a bank enable output signal (i.e., Bank0_EN_o) to high ("1"), thus causing the output Bank0_EN_o of the OR logic gate 362-0 to become high too. When the high value of the Bank0_EN_o signal is combined with a high signal 326-0 at the input of the logical AND gate 364-0, the local buffers 336-0 are enabled. Simultaneously, all other local buffers may be kept disabled by setting to "low" ("0") the bank enable signals Bank3_EN, Bank2_EN, and Bank1_EN of the respective banks 212-3, 212-2, and 212-1.

As another example, the local buffers 336-1 of the adjacent downstream bank 212-1 may be enabled by setting a bank enable signal (i.e., Bank1_EN) to high ("1"), thus enabling local buffers 336 for bank 212-1. The local buffers 336 of the bank 212-0 remain enabled based on (at least) the Bank1_EN_o signal being high. Analogously, each adjacent, downstream bank 212 may be selected to enable the local buffers 336 in that bank and the banks upstream of it (for the periods of time when the read clock 230 is high).

The peripheral bank 212 attached to the function logic 110 (i.e., 212-0 in FIG. 7) may enable all local buffers 336 in the transmission circuit 108. For example, the local buffers 336 of the bank 212-3 may be selected by setting a bank enable output (i.e., Bank3_EN_o) to high, which in turn enables local buffers of the bank 212-3. Furthermore, setting the output Bank3_EN_o of the logical OR gate 364-3 to high, also enables the upstream local buffers 336-2 to 336-0. Thus, the local buffers 336 of each bank 212 upstream from the peripheral bank 212-3 become enabled (again, provided "high" signal from the read clock 230).

FIG. 8 is a block diagram of a global buffer control for a plurality of banks 212 in accordance with an embodiment of the present technology. In some embodiments, a read clock signal (READ CLK) 230 may provide a control signal. In other embodiments, a low bit read address (READ ADDR) 232 may provide a control signal. Local buffers 336 may transfer local data from within the bank 212 to a shift register 328 (illustrated in FIG. 9 below). In operation, global buffers 326 (also referred to as "delays d") transfer global data from banks 212 toward the function logic 110. An AND logic gate 360 at the input of the global buffers 326 enables a bank of the global buffers 326 at each respective transmission bank 212. Thus, global data is transmitted through a series of delays (d) from one bank 212 to another downstream bank 212 toward the function logic 110. The AND logic gate 360 may be referred to as "a global buffer control." In the illustrated embodiment, the global buffer control includes one AND gate. However, in different embodiments, different combinations of logic elements (e.g., AND, OR, NOR, etc. gates) may be used for the global buffer control.

For the illustrated non-mirror operation, the global buffers 326 may be controlled by, for example, first selecting the leftmost bank 212-0 for global data transfer by setting Bank0_EN signal to high, which results in Bank0_EN b being low (0). As a result, the output of the AND gate 360-0 is also low, and only the local buffers 336-0 are enabled. The remaining local buffers 336 and all the global buffers 326 are disabled because the output of the AND gate 360-0, which is low (0) cascades into the input of the next AND gate 360, and so on.

As another example, when the Bank0_EN b is set to 1 (i.e., by setting the Bank0_EN to 0) and Bank1_EN b is also set to 1, the global buffers 326-0 of the bank 212-0 and the local buffers 336-1 of the bank 212-1 are enabled, in addition to the already enabled local buffers 336-0 of the bank 212-0. In some embodiments, the Bank1_EN b signal is referred to as an inversion signal of the Bank1_EN signal. Further downstream, the banks 212 can also be selected to additionally enable that bank's local buffers 326 and the global buffers 336 of the upstream bank. Ultimately, by setting the Bank2_EN b signal to high (1), all the local buffers 336 and global buffers 326 of the data transmission circuit 108 are enabled. As explained above, selective enabling/disabling of the local and global buffers may reduce power consumption and signal noise in an image circuit.

Figures 9A, 9B:
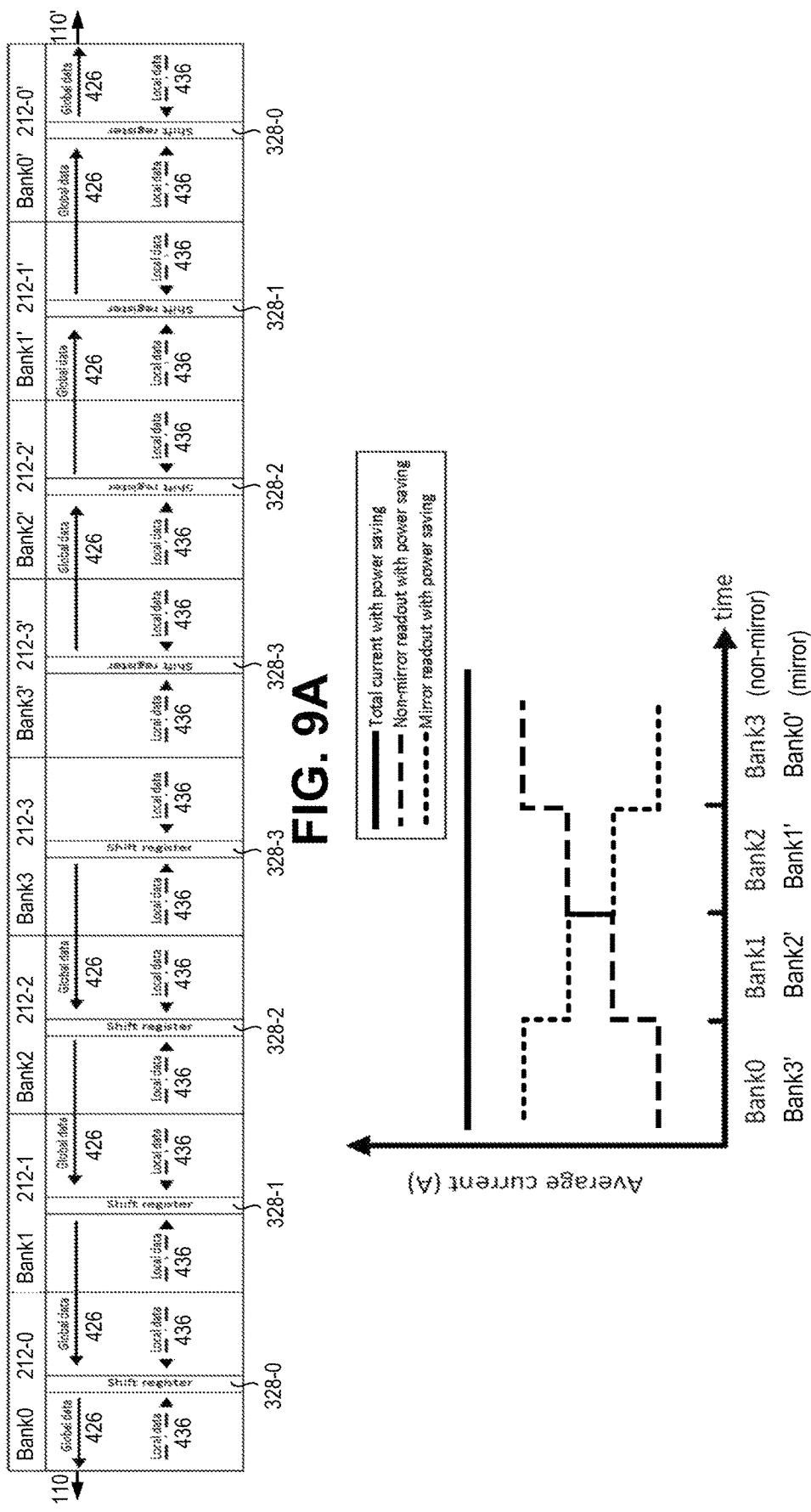
FIG. 9A is a block diagram of a plurality of banks in accordance with an embodiment of the present technology.
FIG. 9B is a graph of the average current of an example image sensor accordance with an embodiment of the present technology.

FIG. 9A is a block diagram of a plurality of banks 212 in accordance with an embodiment of the present technology. The illustrated embodiment includes the mirror and non-mirror readouts of image data. For simplicity, six banks 212 are illustrated, but in other embodiments the system may include more or fewer banks 212. Each bank includes a shift register 328 that receives local data 436 from within the bank 212, and global data 426 from an adjacent, upstream bank 212. Image data may flow from each bank to a function logic 110 or 110' at the periphery of the array of banks. In a sample mirror readout, the global data 426 flows from the shift registers 328 of the banks 212-3', 212-2', 212-1', and 212-0' such that global data from the bank 212-3' is read out by the function logic 110' first, followed by global data from the bank 212-2' in the next period of time, and so on (as shown in FIG. 9B). Conversely, in the non-mirror readout, global data 426 flows from the shift registers 328 of the bank 212-0 to the function logic 110 first, followed by global data from the bank 212-1, and so on.

Local data 436 in both the mirror and non-mirror readouts may flow from inside of each bank 212 to the shift register 328. For example, local data 436 from bank 212-2 flows from bank 212-2 to the shift register 328-2. In operation, the non-mirror and mirror readouts of image data may take place simultaneously, thus reducing the time required for the data transfer. Furthermore, when data are transferred to both ends of the row of banks 212, the number of transmission lines required to transmit data to each side can be reduced by half, thus reducing the size (i.e., overall height) of a layout of the conductive traces.

FIG. 9B is a graph of the average current in an image sensor as data flows from the internal banks 212 to peripheral banks 212. The horizontal axis indicates the bank enable sequences on a time axis. For example, in the non-mirror readout the bank enable sequence may start at Bank0 and propagate through each adjacent bank to Bank3. In the mirror readout, the readout may be first enabled from the Bank3' and all the banks downstream of it, followed by the readout from the Bank2' and all the banks downstream of it, and so on. The vertical axis shows the average electrical current in the example image sensor (A).

The dash line represents the average current of the non-mirror readout of an image sensor with the power saving techniques of the present technology. As the number of banks (and hence the number of associated data buffers) from which the data is transferred increases, the electrical current associated with this non-mirror readout in the image sensor also increases. Generally, as each additional bank from Bank0 to Bank3 is enabled, the current of the image sensor increases.

The dotted line represents the average current of the mirror readout of an image sensor with the power saving techniques disclosed. When all banks 212-3' to 212-0' of the right-hand side of the illustrated image sensor are enabled, the electrical current is maximized. As the number of enabled banks is decreased, the average current of the mirror readout in the image sensor decreases.

The solid line represents the total current of the image sensor with the power saving techniques implemented. Advantageously, electrical current remains generally constant as the data is transferred via both mirror and non-mirror readouts at the same time. Since the electrical current needed for the data transfer of the image sensor increases as data flows in the illustrated non-mirror readout, and the current decreases as data flows in a mirror readout, the resulting current in the image sensor may remain constant or almost constant, or at least without significant swings associated with the conventional data readout.

FIGS. 10A-10C are charts showing the components of an image sensor transferring data in a non-mirror readout without the power saving techniques implemented, with the local power saving techniques implemented, and with the local and global power saving techniques implemented, respectively. Along the top of each chart is the bank enable sequence. Because the chart represents a non-mirror readout of image data in an image sensor, the bank enable sequence is initiated from the function logic 110 and goes from Bank0, which is connected to the function logic 110, through each upstream bank to Bank3. Along the left side of each chart are the Bank Main Blocks. In other embodiments, data transfer may begin from any other bank, such as Bank2. In illustrated embodiments, each bank includes a read address decoder 222, sense amplifiers 344, shift registers 328, and global buffers 326. To the right side of each of these components, ON and OFF indicate whether the component in each bank is enabled at the time of operation.

At the bottom of each chart is a list of ON (operational or working) components in the image sensor at the time of operation. For instance, the number is listed for operational read address decoders 222 (decoder), sense amplifiers 344 (sense amps), shift registers 328, and global buffers 326, as well as the total number of these operational components (or blocks).

FIG. 10A is a baseline chart of the components of an image sensor transferring data with a non-mirror readout without either the local or global power saving techniques described above. For instance, when data originates from Bank0, all Bank0's components (i.e. read address decoder 222, sense amplifiers 344, shift registers 328, and global buffers 326) are enabled. The shift registers 328 and global buffers 326 of all the banks are enabled, but Bank1, Bank2, and Bank3's read address decoders 222 and sense amplifiers 344 are disabled. The read address decoder 222 and sense amplifiers 344 of each bank is only needed when data is being transferred from that bank to the next downstream bank. These components are disabled in Banks 1-3 when data is transferred from Bank0.

As data is transferred from Bank1 to Bank0, Bank0's read address decoder 222 and sense amplifiers 344 are disabled, and Bank1's read address decoder 222 and sense amplifiers 344 are enabled. All the banks 212, including Bank0, still have their shift registers 328 and global buffers 326 enabled. Data transfer continues in this way, with each bank's read address decoders 222 and sense amplifiers 344 being enabled as the data reaches that bank, and with all shift registers 328 and global buffers 326 remaining enabled throughout the data transfer, until the data reaches Bank0. When the data is transferred from the peripheral Bank3, enabling the global buffers 326 is not applicable (indicated with "NA").

The list at the bottom of the chart shows that only one read address decoder 222 and one sense amplifier 344 is operational at a time. However, all four shift registers 328 are operational as data flows from Bank3 to Bank0. Furthermore, all three global buffers 326 are enabled during this data transfer (Bank3 does not include global buffers 326). Therefore, the shift registers 328 (local buffers 336) and the global buffers 326 are enabled throughout the data transfer. As a result, power dissipation of the image sensor is relatively high, since more blocks are operational throughout the data transfer process. Furthermore, having the global buffers 326 enabled during data transfer may also increase the signal noise as the timing of the counters may overlap with the data transmission.

FIG. 10B is a chart showing the components of an image sensor in operation using the local power saving technique shown in FIG. 7. Circled on the chart are those components of each bank 212 that are disabled when the local power saving technique is implemented, in addition to the components being disabled in the baseline case illustrated in FIG. 10A.

In operation, data may flow from Bank3 to Bank0. In the first step, all Bank0's components are enabled for transferring global data from Bank0 to the function logic 110. The sense amplifiers 334 and the read address decoder 222 of Bank1-Bank3 are all disabled in this step, as explained in FIG. 10A. However, the shift registers 328 of Bank1-Bank3 are also disabled. As explained with respect to FIG. 7, the shift registers 328 of Bank1-Bank3 may be disabled to conserve power, because they are not being used to transfer data. Only the shift registers 328 of Bank0 are enabled to receive local data from within the bank, and to transfer global data to the function logic 110. When the shift registers 328 of Bank1 are also enabled, the shift registers of Bank2 and Bank3 remain disabled, therefore still not consuming power. The process continues till the shift registers of Bank3 and all the downstream banks are enabled.

When the local power saving technique shown in FIG. 7 is implemented in the image sensor, the number of working blocks decreases from nine to six as image data is being transferred from Bank3 to Bank0. As the data transfers through each bank towards the function logic 110, the shift registers may be enabled to facilitate data transfer, meaning the operational blocks increase from 6 to 9 as the data is transferred to the function logic. However, because the shift registers of Banks1-3 are disabled at least some periods of time, power can be saved during the data transfer, as some components that are not needed remain non-operational and non-powered when not engaged in data transfer.

FIG. 10C is a chart showing the components of an image sensor using both the local power saving technique shown in FIG. 7 and the global power saving technique shown in FIG. 8. Circled on the chart are the components that are disabled when both power saving techniques are used.

In operation, data transfer may begin from Bank0 (for the non-mirror data transfer). All the components of Bank0 are enabled, but some components of Bank1-Bank3 may be disabled. Because Bank1-Bank3 are not currently transmitting data, their shift registers 328 and global buffers 326 may be disabled until needed to facilitate data transfer to the function logic 110. In this chart, global buffers 326 can include both read clock signals 230 and low bit read address signals 232. The shift registers 328 may be enabled in Bank0 as it receives global data from Bank1 and receives local data from inside Bank0. As data is transferred from Bank2 to Bank1, Bank2's global buffers are enabled so that the data can be transferred to Bank1. Next, Bank1's shift register may be enabled to receive global data from Bank2 and its own local data from inside Bank1. The data may then be transferred to each subsequent adjacent bank down to the peripheral Bank0, and eventually to the function logic 110. Because Banks 1-3 have their shift registers and global buffers disabled until they are necessary for data transmission, power dissipation may be reduced. As data flows through each downstream bank towards the function logic, the number of working blocks increases from 3 to 9, as shift registers and global buffers for each subsequent bank are enabled. Lower number of working components generally reduces the power dissipation in the image sensor during data transmission. Additionally, signal noise may be reduced by disabling the global buffers, as the timing of the counter and the data transmission is less likely to overlap.

Many embodiments of the technology described above may take the form of a computer or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured, or constructed to perform one or more of the computer-executable instructions described above. Of course, any logic or algorithm described herein can be implemented in software or hardware or a combination of software and hardware.

The above description of illustrated examples of the invention, including what is described in the Abstract is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be constructed to limit the invention to the specific examples disclosed in the specification, Rather the scope of the invention is to be determined entirely by the following claims, which are to be construed in accordance with established doctrines of claim interpretation.

What is claimed is:

1. A data transmission circuit for an image sensor, the data transmission circuit comprising:
    a plurality of banks coupled in a series, wherein a peripheral bank of the plurality of transmission banks is coupled to a function logic, wherein each bank comprises a plurality of local buffers coupled to a local buffer control and a plurality of global buffers coupled to a global buffer control,
    wherein the local buffers are settable to their enabled or disabled state by a bank enable command at the local buffer control,
    wherein the enabled local buffers are configured to transfer local data to shift registers of their respective bank, and
    wherein the disabled local buffers are configured not to transfer the local data to the shift register of their respective bank.

2. The data transmission circuit of claim 1, wherein:
    the peripheral bank is configured not to transfer the local data to the shift registers of the peripheral bank; and
    at least one non-peripheral bank is configured to transfer the local data to the shift registers of the non-peripheral bank.

3. The data transmission circuit of claim 1, wherein the local buffer control comprises an OR gate coupled to an AND gate.

4. The data transmission circuit of claim 2, wherein:
    the bank enable command of the local buffer control is a first bank enable command,
    the global buffers are settable to their enabled or disabled state by a second bank enable command;
    the enabled global buffers are configured to transfer a global data to the shift registers of their respective bank, and
    the disabled global buffers are configured not to transfer the global data to the shift register of their respective bank.

5. The data transmission circuit of claim 4, wherein individual shift registers comprise:
    a MUX configured to receive the local data at one input and the global data at another input; and
    an interface D flip flop (DFF) operationally coupled to an output of the MUX,
    wherein the MUX outputs either the local data or the global data based on a bank selection input.

6. The data transmission circuit of claim 4, wherein the second bank enable command is an inversion signal of the first bank enable command.

7. The data transmission circuit of claim 4, wherein the global buffer control comprises an AND gate.

8. The data transmission circuit of claim 4, wherein the plurality of banks is a first plurality of banks, a peripheral bank is a first peripheral bank, and the function logic is a first function logic, and wherein the global data is the first global data configured to be transferred toward the first function logic, the data transmission circuit further comprising:
    a second plurality of banks coupled in a series, wherein a peripheral bank of the second plurality of transmission banks is coupled to a second function logic, wherein the global data of the second plurality of banks is configured to be transferred toward a second function logic that is coupled to a second peripheral bank of the second plurality of banks.

9. The data transmission circuit of claim 1, wherein the local buffers of at least one bank are disabled.

10. The data transmission circuit of claim 9, wherein the at least one bank that is disabled is a peripheral bank that is coupled to the function logic of the image sensor.

11. A method for saving power in a data transmission circuit of an image sensor, comprising:
    routing image data from pixels of the image sensor to a plurality of banks that are coupled in series, wherein a peripheral bank of the plurality of banks is coupled to a function logic, wherein each bank comprises a plurality of local buffers and a plurality of global buffers;
    setting a first bank enable command of a first local buffer control of a first bank to a first value;
    in response to the first bank enable command, enabling first local buffers of the first bank for receiving local data;
    setting a second bank enable command to at least a second local buffer control of a second bank to a second value, wherein the second value is different than the first value;
    in response to the second bank enabling command, disabling second local buffers of the second bank from receiving the local data; and
    transferring the local data of the first bank to a first shift register of the first bank via the local buffers of the first bank.

12. The method of claim 11, further comprising:
    setting a third bank enable command of a first global buffer control of the first bank to a third value;
    in response to the third bank enable command, enabling first global buffers of the first bank for receiving global data;
    setting a fourth bank enable command of at least a second global buffer control of the second bank to a fourth value, wherein the fourth value is different from the third value;
    in response to the fourth bank enabling command, disabling at least second global buffers of the second bank from receiving the global data; and
    transferring the global data of the first bank away from the first bank toward the peripheral bank.

13. The method of claim 12, wherein the third bank enable command is an inversion signal of the first bank enable command.

14. The method of claim 11, further comprising:
    setting the second bank enable command to the second local buffer control of the second bank to the first value;
    in response to the second bank enable command, enabling the second local buffers of the second bank for receiving the local data; and
    transferring the local data of the second bank to a second shift register of the second bank via the local buffers of the second bank.

15. The method of claim 14, wherein the local buffers of at least one bank remain disabled.

16. The method of claim 15, wherein the at least one bank that remains disabled is a peripheral bank that is coupled to the function logic of the image sensor.

17. The method of claim 14, wherein the local buffers of all banks are enabled.

18. The method of claim 14, further comprising:
enabling local buffers of a next bank by enabling a local buffer control of the next bank; and
transferring the local data of the next bank to its shift register via the local buffers of the next bank.

19. The method of claim 14, further comprising:
setting the fourth bank enable command to the second global buffer control of the second bank to the third value;
in response to the third bank enable command, enabling the second global buffers of the second bank for receiving the global data; and
transferring the global data of the second bank away from the second bank toward the peripheral bank.

20. The method of claim 12, wherein the plurality of banks is a first plurality of banks, a peripheral bank is a first peripheral bank, and the function logic is a first function logic, the method further comprising:
transferring the global data of a second plurality of banks toward a second function logic that is coupled to a second peripheral bank of the second plurality of banks.

* * * * *